(12) United States Patent
Yamakawa

(10) Patent No.: US 9,522,414 B2
(45) Date of Patent: Dec. 20, 2016

(54) INSPECTION SYSTEM

(71) Applicant: ISHIDA CO., LTD., Kyoto-shi, Kyoto (JP)

(72) Inventor: Atsushi Yamakawa, Ritto (JP)

(73) Assignee: ISHIDA CO., LTD., Kyoto (JP)

(*) Notice: Subject to any disclaimer, the term of this patent is extended or adjusted under 35 U.S.C. 154(b) by 0 days.

(21) Appl. No.: 14/760,686

(22) PCT Filed: Dec. 17, 2013

(86) PCT No.: PCT/JP2013/083699
§ 371 (c)(1),
(2) Date: Jul. 13, 2015

(87) PCT Pub. No.: WO2014/112269
PCT Pub. Date: Jul. 24, 2014

(65) Prior Publication Data
US 2015/0352596 A1 Dec. 10, 2015

(30) Foreign Application Priority Data
Jan. 17, 2013 (JP) ................... 2013-006778

(51) Int. Cl.
B07C 5/16 (2006.01)
B07C 5/18 (2006.01)
(Continued)

(52) U.S. Cl.
CPC . B07C 5/18 (2013.01); B07C 5/16 (2013.01); B07C 5/36 (2013.01); B07C 5/362 (2013.01);
(Continued)

(58) Field of Classification Search
CPC ............... B07C 5/18; B07C 5/20; B07C 5/36; B07C 5/361; B07C 5/362; B65G 47/766; B65G 47/82
(Continued)

(56) References Cited

U.S. PATENT DOCUMENTS 1,729,671 A * 10/1929 Bell-Irving .......... B65G 47/766
198/367
3,083,808 A * 4/1963 Graybeal ................ B65B 35/46
198/370.08
(Continued)

FOREIGN PATENT DOCUMENTS

JP 11-198911 A 7/1999
JP 2002-114366 A 4/2002
(Continued)

Primary Examiner — Joseph C Rodriguez
(74) Attorney, Agent, or Firm — Global IP Counselors, LLP

(57) ABSTRACT

An inspection system is provided with a weight inspection device, a sorting device, and a frame. The weight inspection device includes a weighing conveyor for conveying a weighing object, and a load cell for weighing the weighing object conveyed by the weighing conveyor, and inspects the weighing object using the result of weighing by the load cell. The sorting device includes an sorting conveyor arranged downstream of the weighing conveyor, a movable member being configured to come in contact with the weighing object conveyed by the sorting conveyor to change a traveling direction of the weighing object, and a cylinder for driving the movable member based on the result of inspection by the weight inspection device so as to cause the movable member to come in contact with the weighing object. The frame supports the weighing conveyor, the load cell, and the movable member.

10 Claims, 7 Drawing Sheets

(51) Int. Cl.
  *B07C 5/36* (2006.01)
  *G01G 19/03* (2006.01)
  *G01G 21/23* (2006.01)
  *B65G 47/76* (2006.01)
  *G01G 11/00* (2006.01)
  *B65G 21/06* (2006.01)

(52) U.S. Cl.
  CPC .............. *B65G 47/766* (2013.01); *G01G 11/00* (2013.01); *G01G 19/03* (2013.01); *G01G 21/23* (2013.01); *B65G 21/06* (2013.01)

(58) Field of Classification Search
  USPC .......................................... 209/592, 596, 645
  See application file for complete search history.

(56) References Cited

U.S. PATENT DOCUMENTS

| | | | | |
|---|---|---|---|---|
| 4,441,604 A * | 4/1984 | Schlig | ................ | B65G 47/846 198/370.08 |
| 4,643,291 A * | 2/1987 | Counter | ................ | B65G 47/82 198/367 |
| 4,711,357 A * | 12/1987 | Langenbeck | ........... | B07C 5/362 198/367 |
| 5,246,118 A * | 9/1993 | Mosher | .................... | B07C 5/28 177/52 |
| 5,452,786 A * | 9/1995 | Gilmore | ............... | B65G 47/766 198/367 |
| 5,760,342 A * | 6/1998 | Takeda | ................. | G01G 19/393 177/25.18 |
| 5,918,724 A * | 7/1999 | Terrell | ................. | B65G 47/766 198/367 |
| 6,151,866 A * | 11/2000 | Connell | ................ | G01G 19/38 209/657 |
| 6,533,125 B1 * | 3/2003 | Jensen | ................. | G01G 19/303 198/370.02 |
| 6,843,169 B2 * | 1/2005 | Nielsen | ............... | A22C 21/0053 452/156 |
| 6,910,568 B1 * | 6/2005 | Ydoate | ................. | B65G 47/766 198/367 |
| 6,974,020 B1 * | 12/2005 | Peppel | ................. | B65G 47/493 198/370.07 |
| 7,124,876 B2 * | 10/2006 | Wolf | ..................... | B65G 47/766 198/367 |
| 7,472,031 B2 * | 12/2008 | Georgitsis | ............... | G01G 11/04 177/25.13 |
| 7,600,643 B2 * | 10/2009 | Georgitsis | ................. | B07C 5/36 209/552 |
| RE41,360 E * | 6/2010 | Peppel | ................. | B65G 47/766 198/367 |
| 7,954,622 B2 * | 6/2011 | Schimmel | .............. | B65G 47/82 198/367.1 |
| 8,146,730 B2 * | 4/2012 | Sng | ....................... | B65G 47/766 198/367 |
| 8,561,781 B2 * | 10/2013 | Terrell | .................. | B65G 47/766 198/370.07 |
| 8,757,352 B1 * | 6/2014 | Daboub | ................. | B07C 3/065 198/367 |
| 8,812,146 B2 * | 8/2014 | Einarsson | ................. | B07C 5/38 209/592 |
| 2015/0257398 A1 * | 9/2015 | Pedersen | ............. | A22C 17/0093 198/368 |

FOREIGN PATENT DOCUMENTS

| | | |
|---|---|---|
| JP | 2004-361156 A | 12/2004 |
| JP | 2007-136249 A | 6/2007 |
| JP | 2010-254413 A | 11/2010 |
| JP | 2011-088737 A | 5/2011 |

* cited by examiner

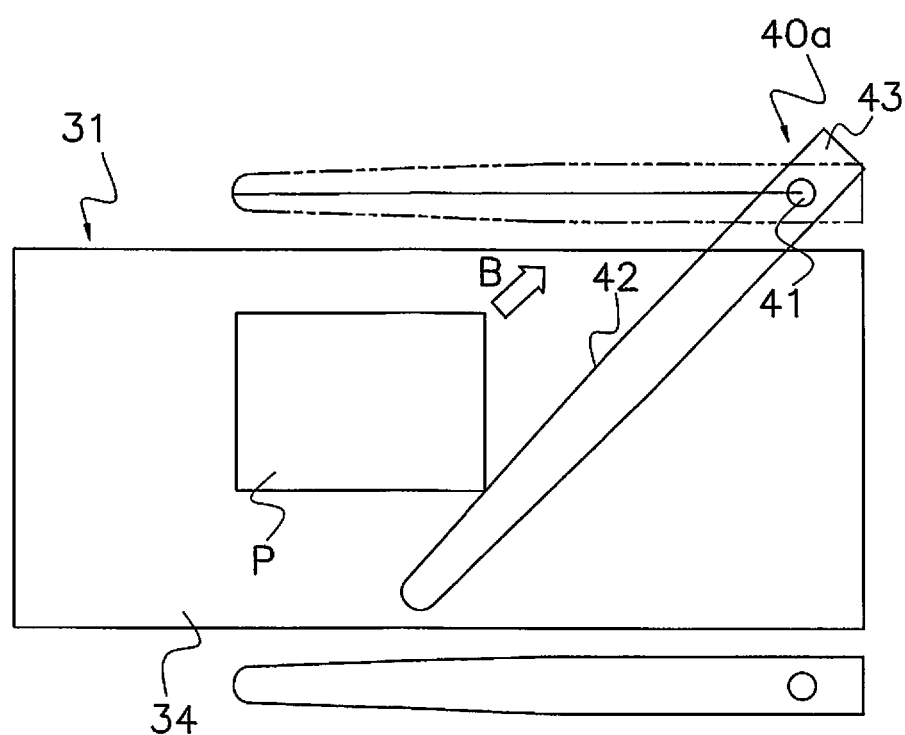
F I G. 6

(a)

(b)

INSPECTION SYSTEM

CROSS-REFERENCE TO RELATED APPLICATIONS

This U.S. National stage application of PCT/JP2013/083699 claims priority under 35 U.S.C. §119(a) to Japanese Patent Application No. 2013-006778, filed in Japan on Jan. 17, 2013, the entire contents of which are hereby incorporated herein by reference.

TECHNICAL FIELD

The present invention relates to an inspection system, and more specifically relates to an inspection system for weighing a weighing object conveyed by a weighing conveyor and inspecting the weighing object, and operating a downstream sorting device based on the inspection result to sort the weighing object.

BACKGROUND ART

Conventional inspection systems are known in which the weight of a weighing object is detected by a weighing instrument, the quality of the weighing object is determined using the detection result, and the weighing object is sorted by a downstream sorting device based on the determination result.

For example, in the inspection system disclosed in Patent Literature 1 (Japanese Laid-open Patent Publication No. 2002-114366), the weight of a weighing object conveyed by a weighing conveyor is detected by a weighing instrument, and the quality of the weighing object is determined using the detection result. Then, in a downstream sorting device, an arm provided to a sorting conveyor is operated based on the result of determination by the weight inspection device, and the arm changes a traveling direction of the weighing object, whereby the weighing object is sorted as a conforming article or a defective article.

SUMMARY OF THE INVENTION

Problems that the Invention is Intended to Solve

However, in Patent Literature 1 (Japanese Laid-open Patent Publication No. 2002-114366), the weight inspection device and the sorting device are separate elements, legs for supporting the weighing device and legs for supporting the sorting device are necessary respectively, and the problem emerges that a floor below the devices is difficult to clean up.

An object of the present invention is to provide an inspection system for determining the quality of a weighing object using the weight thereof detected at a weighing conveyor and sorting the weighing object by operating a downstream sorting device based on the determination result, the inspection system having excellent ease of cleaning.

Means for Solving the Problems

An inspection system according to the present invention is provided with a weight inspection device, a sorting device, and a common frame. The weight inspection device includes a weighing conveyor for conveying a weighing object, and a weighing instrument for weighing the weighing object conveyed by the weighing conveyor. The weight inspection device inspects the weighing object using the result of weighing by the weighing instrument. The sorting device includes a sorting conveyor, a movable member, and a drive part. The sorting conveyor is arranged downstream of the weighing conveyor. The movable member is configured to come in contact with the weighing object conveyed by the sorting conveyor to change a traveling direction of the weighing object. The drive part drives the movable member based on the result of inspection by the weight inspection device so as to cause the movable member to come in contact with the weighing object. The common frame supports the weighing conveyor, the weighing instrument, and the movable member.

Here, as the weighing conveyor and weighing instrument of the weight inspection device and the movable member of the sorting device are fixed to the common frame, a periphery of legs of the inspection system can have a simple structure relative to a configuration in which the weight inspection device and the sorting device have individual frames. As a result, a compact inspection system having excellent ease of cleaning can be provided.

In the inspection system according to the present invention, the movable member preferably includes a rotary shaft, an arm member, and a balance member. Preferably, the rotary shaft is supported by the common frame and is rotatably driven by the drive part. Preferably, the arm member extends from the rotary shaft in a radial direction of the rotary shaft and is configured to come in contact with the weighing object when the rotary shaft is rotatably driven by the drive part. Preferably, the balance member extends from the rotary shaft in an opposite direction from the arm member.

Here, as the balance member extending in the opposite direction from the arm member with respect to the rotary shaft is provided, the vibration of the rotary shaft in an axial direction can be suppressed. The inspection precision of the weight inspection device is therefore not prone to be adversely affected even though the weighing conveyor, the weighing instrument and the rotary shaft of the arm member are supported by the common frame. As a result, an inspection system having excellent ease of cleaning can be provided while inspection precision and inspection efficiency are maintained.

In the inspection system according to the present invention, the rotary shaft preferably extends in a direction perpendicular to a conveying surface of the sorting conveyor. Preferably, the arm member and the balance member rotate along a plane parallel to the conveying surface of the sorting conveyor.

Here, the arm member and the balance member rotate along a plane parallel to the conveying surface of the sorting conveyor, and a large torsional moment therefore acts on the rotary shaft. However, as the balance member is provided, the vibration of the rotary shaft in the axial direction thereof that is caused by the rotation of the arm member can be suppressed. The inspection precision of the weight inspection device is therefore not prone to be adversely affected even though the weighing conveyor, the weighing instrument and the rotary shaft of the arm member are supported by the common frame. As a result, an inspection system having excellent ease of cleaning can be provided while inspection precision and inspection efficiency are maintained.

In the inspection system according to the present invention, the rotary shaft preferably extends in a direction perpendicular to a conveying surface of the weighing conveyor. Preferably, the balance member intersects a plane through which a center of gravity of the arm member passes when the rotary shaft is rotatably driven by the drive part.

Here, as the balance member is disposed so as to intersect the plane through which the center of gravity of the arm member passes, the arm member and the balance member are readily balanced about the rotary shaft. Vibration of the rotary shaft in the axial direction thereof that is caused by the rotation of the arm member can therefore be suppressed. In other words, it is possible to suppress vibration of the rotary shaft in the direction perpendicular to the conveying surface of the weighing conveyor that occurs when the arm member is rotated. The inspection precision of the weight inspection device is therefore not prone to be adversely affected even though the weighing conveyor, the weighing instrument and the rotary shaft of the arm member are supported by the common frame. As a result, an inspection system having excellent ease of cleaning can be provided while inspection precision and inspection efficiency are maintained.

Furthermore, in the inspection system according to the present invention, the center of gravity of the balance member is preferably disposed in the plane through which the center of gravity of the arm member passes when the rotary shaft is rotatably driven by the drive part.

Here, it is particularly easy for the arm member and the balance member to be balanced about the rotary shaft, and it is particularly easy to suppress vibration of the rotary shaft in the axial direction thereof that accompanies the rotation of the arm member. As a result, an inspection system having excellent ease of cleaning can be provided while inspection precision and inspection efficiency are maintained.

In the inspection system according to the present invention, the balance member is preferably provided in order to suppress vibration of the arm member in the direction perpendicular to the conveying surface of the weighing conveyor.

Through this configuration, the inspection precision of the weight inspection device is not prone to be adversely affected even though the weighing conveyor, the weighing instrument and the rotary shaft of the arm member are supported by the common frame. As a result, an inspection system having excellent ease of cleaning can be provided while inspection precision and inspection efficiency are maintained.

In the inspection system according to the present invention, the moment of inertia of the arm member and the balance member about the rotary shaft is preferably larger than the moment of inertia of only the arm member about the rotary shaft.

Since a larger drive power is usually needed in the drive part when the moment of inertia becomes larger, a small moment of inertia is preferred. However, providing the balance member makes the inspection precision of the weight inspection device less prone to be adversely affected. As a result, an inspection system having excellent ease of cleaning can be provided while inspection precision and inspection efficiency are maintained.

In the inspection system according to the present invention, the product of the weight of the balance member and the distance from the center of gravity of the balance member to an axial center of the rotary shaft is preferably set so as to approach the product of the weight of the arm member and the distance from the center of gravity of the arm member to the axial center of the rotary shaft.

Disparity (unbalance) of the rotary shaft is thereby easily overcome, and vibration of the rotary shaft in the axial direction thereof that accompanies the rotation of the arm member can be suppressed. Specifically, the inspection precision of the weight inspection device is not prone to be adversely affected even though the weighing conveyor, the weighing instrument and the rotary shaft of the arm member are supported by the common frame. As a result, an inspection system having excellent ease of cleaning can be provided while inspection precision and inspection efficiency are maintained.

In the inspection system according to the present invention, the weight of the balance member is preferably equal to or greater than 30% of the total of the weight of the balance member and the weight of the arm member.

The weight of the balance member is more preferably equal to or greater than 50% of the total of the weight of the balance member and the weight of the arm member.

Here, the balance member having an adequate weight is provided, whereby disparity (unbalance) of the rotary shaft is easily overcome, and vibration of the rotary shaft in the axial direction thereof that accompanies the rotation of the arm member can be suppressed. Specifically, the inspection precision of the weight inspection device is not prone to be adversely affected even though the weighing conveyor, the weighing instrument, the rotary shaft of the arm member are supported by the common frame. As a result, an inspection system having excellent ease of cleaning can be provided while inspection precision and inspection efficiency are maintained.

Preferably, in the inspection system according to the present invention, the timing at which a weighing object is weighed by the weighing instrument and the timing at which the rotary shaft is driven by the drive part at least partially overlap.

Here, weighing by the weighing instrument is performed while the rotary shaft is being driven, and high inspection efficiency can therefore be maintained.

In the inspection system according to the present invention, the common frame preferably also supports the sorting conveyor.

Here, the periphery of the legs of the inspection system can have a simple structure relative to a configuration in which the weight inspection device and the sorting device have individual frames. As a result, a compact inspection system having excellent ease of cleaning can be provided.

Advantageous Effects of Invention

In the inspection system according to the present invention, the weighing conveyor and weighing instrument of the weight inspection device and the movable member of the sorting device are fixed to the common frame, and the periphery of the legs of the inspection system can therefore have a simple structure relative to a configuration in which the weight inspection device and the sorting device have individual frames. As a result, a compact inspection system having excellent ease of cleaning can be provided.

BRIEF DESCRIPTION OF THE DRAWINGS

FIG. 5 illustrates the sorting mechanism disposed on the left side of the sorting conveyor.

FIG. 6 is a schematic plan view of the sorting device, illustrating the operation of the movable member of the sorting mechanism illustrated in FIG. 5. FIG. 6 illustrates the operation of the sorting mechanism disposed on the left side of the sorting conveyor.

FIG. 7(a) illustrates a movable-member portion of a conventional arm-type sorting mechanism not having a balance member. FIG. 7(b) illustrates the movable-member portion of the sorting mechanism illustrated in FIG. 5.

FIG. 8 is a sectional view of a rail portion formed in the support column body. FIG. 8 also illustrates the state in which the support column body and the frame are fixed by a bolt.

FIG. 9 also illustrates the state in which the rail member and the rail fixing parts of the housing of the sorting mechanism are fixed by bolts, and the state in which the rail member and the sub-frame are fixed by bolts.

DETAILED DESCRIPTION OF THE INVENTION

The inspection system 1 according to an embodiment of the present invention will be described below with reference to the drawings. The embodiments described below may be modified, as appropriate, within the intended scope of the present invention.

(1) Overall Configuration

The inspection system 1 according to the present embodiment is a system for inspecting the weight of a weighing object P and sorting weighing objects P in accordance with the results of weight inspection.

Figure 1:
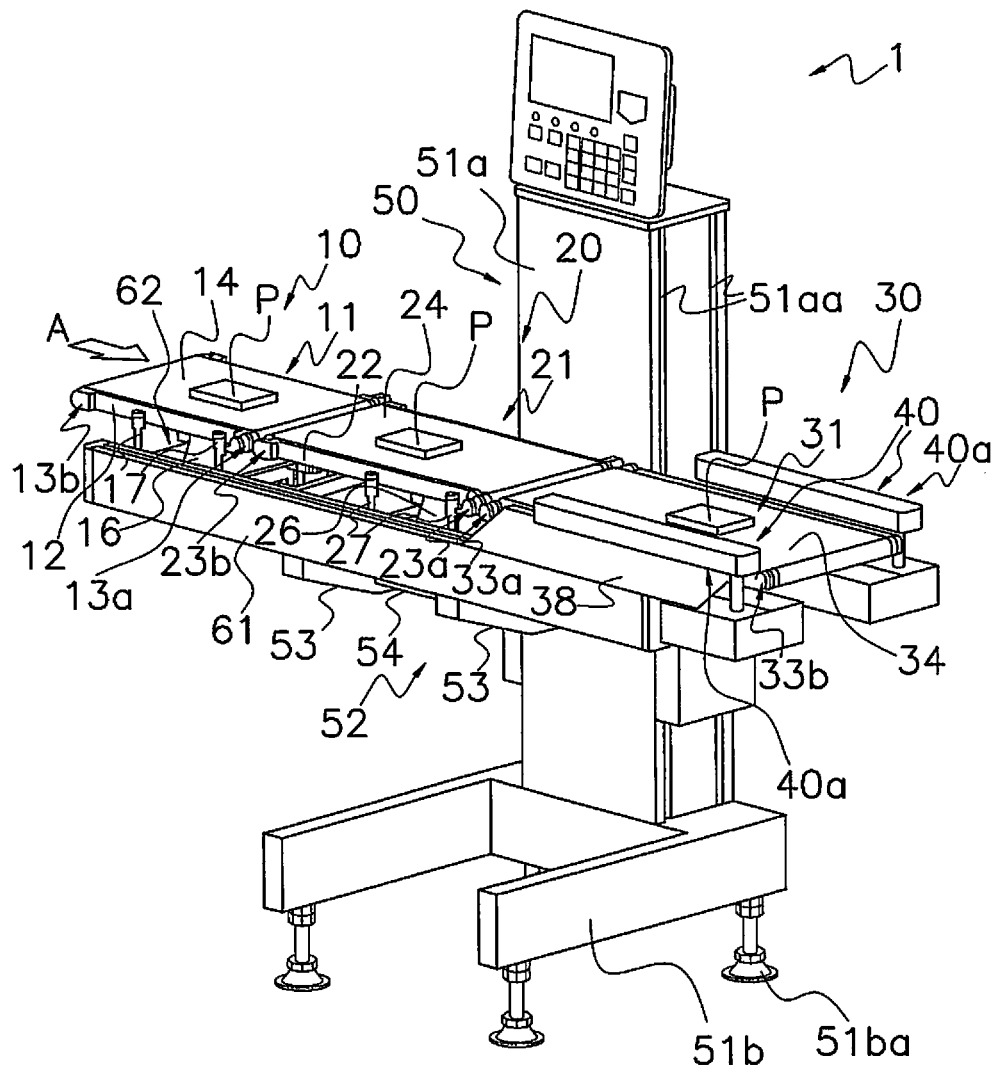
FIG. 1 is a perspective view of the inspection system according to an embodiment of the present invention.
Figure 1:
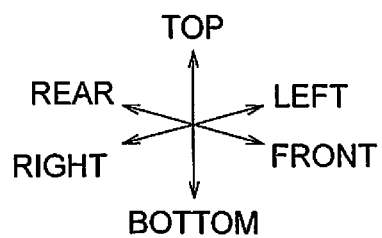

As illustrated in FIG. 1, the inspection system 1 has primarily an introduction device 10, a weight inspection device 20, and a sorting device 30.

The introduction device 10, the weight inspection device 20, and the sorting device 30 are supported by a frame 52 fixed to a support column 50. The movement of each part of the inspection system 1 is controlled by a control unit 80 (see FIG. 2).

The introduction device 10 receives a weighing object P supplied from an upstream process (e.g., a combination weighing/bagging and packaging process) not illustrated in the drawing, and introduces the weighing object to the inspection system 1.

The weight inspection device 20 inspects whether the weight of the weighing object P is within an allowable weight range. For the weight of the weighing object P to be within the allowable weight range means, in other words, that the weight of the weighing object P is no less than an allowable minimum weight and no greater than an allowable maximum weight.

The sorting device 30 sorts the weighing object P based on the result of inspection by the weight inspection device 20. Specifically, the sorting device 30 conveys a weighing object P determined to have passed the weight inspection by a sorting conveyor 31 described hereinafter, and supplies the weighing object to a downstream process (e.g., a process for boxing the weighing object P) not illustrated in the drawing. The sorting device 30 also removes a weighing object P determined to have failed the weight inspection from the sorting conveyor 31.

The control unit 80 has a function unit for controlling each of the introduction device 10, the weight inspection device 20, and the sorting device 30, and constitutes a portion of the introduction device 10, the weight inspection device 20, and the sorting device 30. The control unit 80 also functions as a general control unit for comprehensively controlling the introduction device 10, the weight inspection device 20, and the sorting device 30.

(2) Detailed Configuration

The introduction device 10, the weight inspection device 20, the sorting device 30, the support column 50, the frame 52, and the control unit 80 of the inspection system 1 will be described in detail below.

Expressions such as "front," "rear," "top," "bottom," "left," and "right" may be used below when describing directions and/or positional relationships. Unless otherwise specified, the expressions "front," "rear," "top," "bottom," "left," and "right" will be used in accordance with the arrows in FIG. 1.

(2-1) Introduction Device

The introduction device 10 is a device for receiving a weighing object P from an upstream side and introducing the weighing object to the inspection system 1. The introduction device 10 has primarily an introduction conveyor 11 for conveying the weighing object P, as illustrated in FIG. 1.

(2-1-1) Introduction Conveyor

Figure 2:
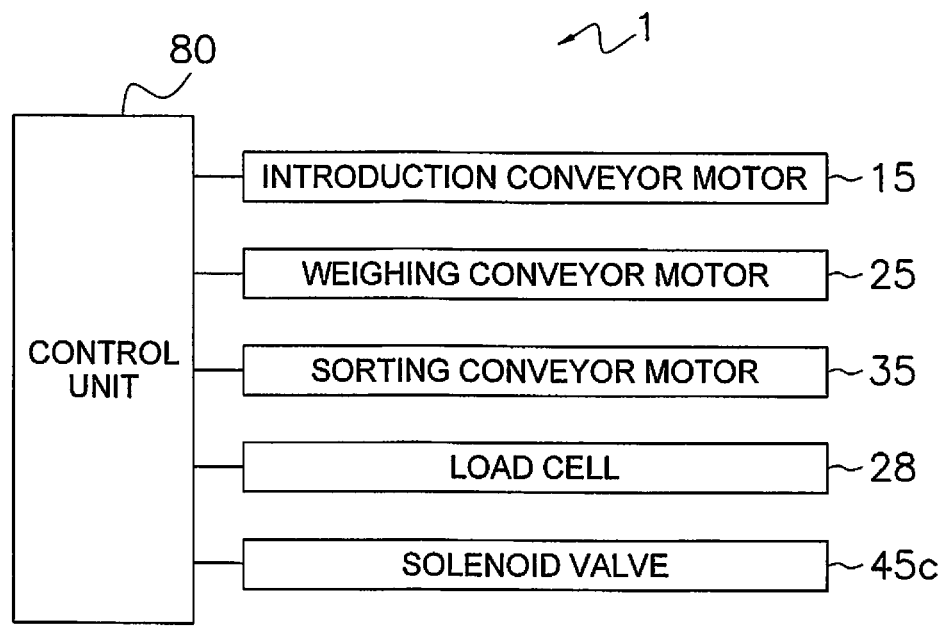
FIG. 2 is a block diagram of the inspection system illustrated in FIG. 1.

As illustrated in FIGS. 1 and 2, the introduction conveyor 11 has primarily an introduction conveyor frame 12, a drive roller 13a, a driven roller 13b, a flat belt 14, and an introduction conveyor motor 15.

The introduction conveyor frame 12 is supported by a conveyor attachment bracket 17 extending from a case 16. The case 16 is disposed below the introduction conveyor frame 12, and accommodates the introduction conveyor motor 15 therein. The case 16 is fixed to a sub-frame 62 connected to a rail member 61 described hereinafter.

As illustrated in FIG. 1, the drive roller 13a and the driven roller 13b are provided at opposite ends of the introduction conveyor frame 12. The drive roller 13a and the driven roller 13b are rotatably supported by the introduction conveyor frame 12.

The flat belt 14 is a conveyance belt wound around and between the two rollers 13a, 13b. The drive roller 13a is driven by the introduction conveyor motor 15, and the flat belt 14 thereby conveys a weighing object P, received from an upstream conveyor not illustrated in the drawing, in the direction indicated by the arrow A in FIG. 1, also referred to herein below as the conveying direction or the traveling direction. In other words, the drive roller 13a is driven by the introduction conveyor motor 15, and the flat belt 14 thereby conveys the weighing object P horizontally from rear to front (upper left to lower right in FIG. 1). The weighing object P conveyed by the flat belt 14 is transferred to a weighing conveyor 21 of the weight inspection device 20 arranged downstream (at the front side). The movement of the introduction conveyor 11 (movement of the introduction conveyor motor 15) is controlled by the control unit 80.

(2-2) Weight Inspection Device

As illustrated in FIGS. 1 and 2, the weight inspection device 20 has the weighing conveyor 21 and a load cell 28. The weighing conveyor 21 is a conveyor for conveying the weighing object P. As illustrated in FIG. 1, the weighing conveyor 21 is arranged downstream of the introduction conveyor 11. The load cell 28 is an example of a weighing instrument. The load cell 28 measures the weight of a weighing object P conveyed by the weighing conveyor 21. The weight inspection device 20 inspects the weighing object P using the result of weighing by the load cell 28. More specifically, the weight inspection device 20 inspects whether the weight of the weighing object P measured by the load cell 28 is within the allowable weight range. For the weight of the weighing object P to be within the allowable weight range means, in other words, that the weight of the weighing object P is no less than an allowable minimum weight and no greater than an allowable maximum weight.

(2-2-1) Weighing Conveyor

As illustrated in FIGS. 1 and 2, the weighing conveyor 21 has primarily a weighing conveyor frame 22, a drive roller 23a, a driven roller 23b, a flat belt 24, and a weighing conveyor motor 25.

The weighing conveyor frame 22 is supported by conveyor attachment brackets 27 extending from a case 26. The case 26 is disposed below the weighing conveyor frame 22, and accommodates the weighing conveyor motor 25 therein. The case 26 is fixed to a frame 52 described hereinafter.

As illustrated in FIG. 1, the drive roller 23a and the driven roller 23b are provided at opposite ends of the weighing conveyor frame 22. The drive roller 23a and the driven roller 23b are rotatably supported by the weighing conveyor frame 22.

The flat belt 24 is a conveyance belt wound around and between the two rollers 23a, 23b. The drive roller 23a is driven by the weighing conveyor motor 25, and the flat belt 24 thereby conveys a weighing object P, received from the introduction conveyor 11, in the traveling direction indicated by the arrow A in FIG. 1. In other words, the drive roller 23a is driven by the weighing conveyor motor 25, and the flat belt 24 thereby conveys the weighing object P horizontally from rear to front. Movement of the weighing object P along first the flat belt 14 and then the flat belt 24 defines a traveling path in the traveling direction indicated by the arrow A in FIG. 1. The height of a conveying surface of the weighing conveyor 21 (the position of a conveying surface of the flat belt 24 in the vertical direction) is the same as the height of a conveying surface of the introduction conveyor 11 (the position of a conveying surface of the flat belt 14 in the vertical direction). The weighing object P conveyed by the flat belt 24 is transferred to the sorting conveyor 31 of the sorting device 30 arranged downstream (at the front side). The movement of the weighing conveyor 21 (movement of the weighing conveyor motor 25) is controlled by the control unit 80.

(2-2-2) Load Cell

Figure 3:
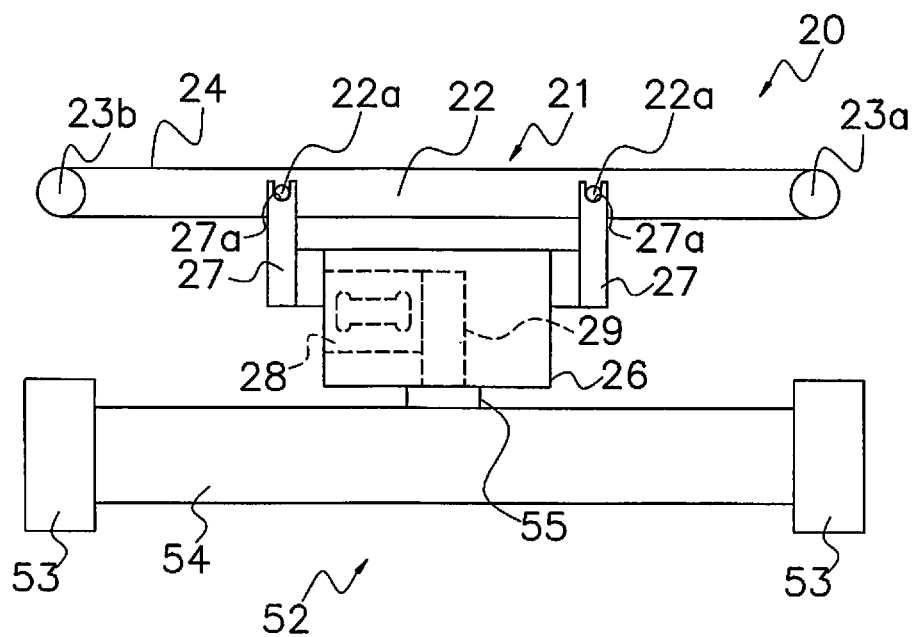
FIG. 3 is a schematic side view illustrating the state in which the weighing conveyor and load cell of the weight inspection device are supported by the frame in the inspection system illustrated in FIG. 1.

The load cell 28 is accommodated inside the case 26 arranged below the weighing conveyor 21 (see FIG. 3). As described above, the weighing conveyor motor 25 for driving the drive roller 23a of the weighing conveyor 21 is also accommodated in the case 26. The weighing conveyor motor 25 is omitted from FIG. 3.

The load cell 28 is fixed to the frame 52. More specifically, one end (a fixed end) of the load cell 28 is fixed via a bracket 29 to a support column 55 extending upward from a second member 54 of the frame 52 described hereinafter. The other end (a free end) of the load cell 28 is fixed to the case 26 in which the load cell 28 is accommodated. The load cell 28 is disposed so that a longitudinal direction thereof is oriented along a conveyance direction (see the arrow A in FIG. 1) of the weighing conveyor 21.

Conveyor attachment brackets 27 (see FIGS. 1 and 3) extending upward are provided to the case 26 in four locations. More specifically, a left-right pair of conveyor attachment brackets 27 is provided at each of a front side and a rear side of the case 26. A downwardly indented U-shaped groove 27a is formed at a top end of each conveyor attachment bracket 27 (see FIG. 3). A pin 22a provided so as to protrude from each of left and right lateral surfaces of the weighing conveyor frame 22 is inserted in each of the grooves 27a (see FIG. 3). The pins 22a inserted in the grooves 27a are supported by the case 26 via the conveyor attachment brackets 27. As a result, the weight of the weighing conveyor 21 (including the weight of the weighing object P during conveyance of the weighing object P) is loaded on the free end of the load cell 28. Through such a configuration, the load cell 28 detects distortion that occurs when the weighing object P is conveyed on the weighing conveyor 21, and can thereby measure the weight of the weighing object P conveyed on the weighing conveyor 21.

A weighing signal from the load cell 28 is transmitted to the control unit 80 constituting a portion of the weight inspection device 20. The control unit 80 as a portion of the weight inspection device 20 inspects the weighing object P using the result of weighing by the load cell 28. Specifically, the control unit 80 determines that the weighing object P passes inspection when the weight of the weighing object P is within the allowable weight range. The control unit 80 determines that the weighing object P fails inspection when the weight of the weighing object P is outside the allowable weight range (when the weighing object is lighter than the allowable minimum weight or heavier than the allowable maximum weight).

(2-3) Sorting Device

As illustrated in FIGS. 1 and 2, the sorting device 30 has the sorting conveyor 31, a sorting mechanism 40, and ramps 38. The sorting conveyor 31 is a conveyor for conveying the weighing object P. As illustrated in FIG. 1, the sorting conveyor 31 is arranged downstream of the weighing conveyor 21. The sorting mechanism 40 changes the travelling direction of a weighing object P which has failed inspection in the weight inspection device 20, and removes the failed weighing object P from the sorting conveyor 31. The ramps 38 are members provided to both the left and right sides of the sorting conveyor 31. The ramp 38 is formed so as to be inclined downward from the sorting conveyor 31. The ramp 38 is a member for guiding a weighing object P removed from the sorting conveyor 31 by the sorting mechanism 40 to a defective-article conveyor not illustrated in the drawing.

(2-3-1) Sorting Conveyor

Figure 4:
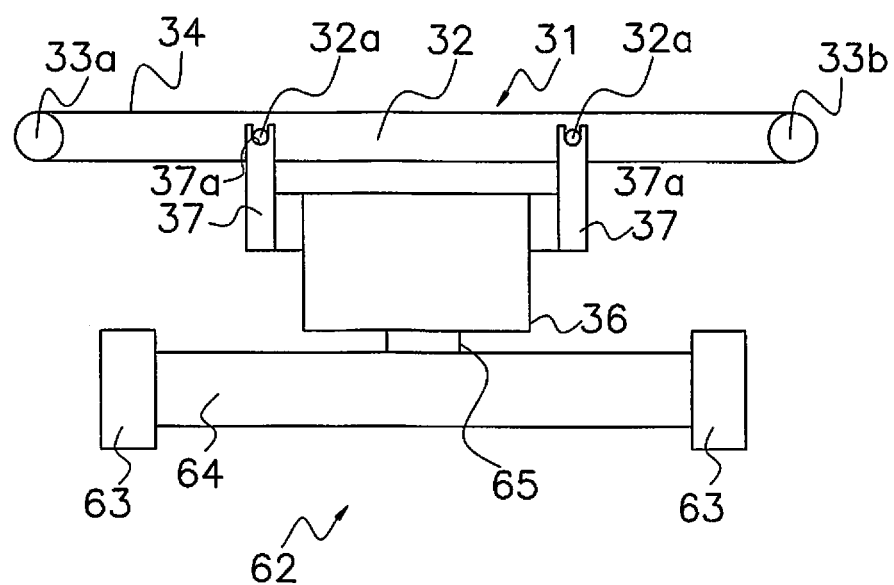
FIG. 4 is a schematic side view illustrating the state in which the sorting conveyor of the sorting device is supported by the sub-frame in the inspection system illustrated in FIG. 1.

As illustrated in FIGS. 2 and 4, the sorting conveyor 31 has primarily a sorting conveyor frame 32, a drive roller 33a, a driven roller 33b, a flat belt 34, and a sorting conveyor motor 35.

The sorting conveyor frame 32 is supported by conveyor attachment brackets 37 extending from a case 36. The case 36 is disposed below the sorting conveyor frame 32, and accommodates sorting conveyor motor 35 therein. The case 36 is fixed to a sub-frame 62 connected to a rail member 61 described hereinafter. More specifically, the case 36 is fixed to a support column 65 extending upward from a second member 64 of the sub-frame 62 described hereinafter (see FIG. 4). As described hereinafter, the rail member 61 is fixed to the frame 52. Specifically, the case 36 is supported by the frame 52 via the rail member 61 and the sub-frame 62.

Conveyor attachment brackets 37 (see FIG. 4) extending upward are provided to the case 36 in four locations. More specifically, a left-right pair of conveyor attachment brackets 37 is provided at each of the front side and the rear side of the case 36. A downwardly indented U-shaped groove 37a is formed at the top end of each conveyor attachment bracket 37 (see FIG. 4). A pin 32a provided so as to protrude from each of left and right lateral surfaces of the sorting conveyor frame 32 is inserted in each of the grooves 37a (see FIG. 4). The pins 32a inserted in the grooves 37a are supported by the case 36 via the conveyor attachment brackets 37. Specifically, the sorting conveyor 31 is supported by the frame 52 via the conveyor attachment brackets 37, the case 36, the support column 65, the sub-frame 62, and the rail member 61.

The introduction conveyor 11 is also supported by the frame 52 via the conveyor attachment bracket 17, the case 16, the support column 65, the sub-frame 62, and the rail member 61, the same as the sorting conveyor 31, but no further description of this configuration is given.

As illustrated in FIG. 4, the drive roller 33a and the driven roller 33b are provided at opposite ends of the sorting conveyor frame 32. The drive roller 33a and the driven roller 33b are rotatably supported by the sorting conveyor frame 32.

The flat belt 34 is a conveyance belt wound around and between the two rollers 33a, 33b. The drive roller 33a is driven by the sorting conveyor motor 35, and the flat belt 34 thereby conveys the weighing object P, received from the weighing conveyor 21, in the direction indicated by the arrow A in FIG. 1. In other words, the drive roller 33a is driven by the sorting conveyor motor 35, and the flat belt 34 thereby conveys the weighing object P horizontally from rear to front. The height of a conveying surface of the sorting conveyor 31 (the position of the conveying surface of the flat belt 34 in the vertical direction) is the same as the height of the conveying surface of the weighing conveyor 21 (the position of the conveying surface of the flat belt 24 in the vertical direction). The weighing object P conveyed by the flat belt 34, which has passed inspection by the weight inspection device 20, is conveyed to a front end part of the sorting conveyor 31 and supplied to a downstream (forward) process not illustrated in the drawing continuing to move along the traveling path in the traveling direction indicated by the arrow A in FIG. 1. The movement of the sorting conveyor 31 (movement of the sorting conveyor motor 35) is controlled by the control unit 80.

(2-3-2) Sorting Mechanism

The sorting mechanism 40 is a so-called arm-type sorting mechanism for sorting weighing objects P by moving an arm member 42 described hereinafter. The movement of the sorting mechanism 40 is controlled by the control unit 80 constituting a portion of the sorting device 30.

One sorting mechanism 40 is provided on each of the left and right of the sorting conveyor 31, as illustrated in FIG. 1. The sorting mechanism 40 arranged on a left side of the sorting conveyor 31 is configured so as to be symmetrical about the sorting conveyor 31 to the sorting mechanism 40 arranged on a right side of the sorting conveyor 31. Primarily the sorting mechanism 40 arranged on the left side of the sorting conveyor 31 will be described herein, using FIG. 5.

Unless otherwise specified, the sorting mechanism 40 arranged on the left side of the sorting conveyor 31 is described. The sorting mechanism 40 arranged on the right side of the sorting conveyor 31 is similar to the sorting mechanism 40 arranged on the left side of the sorting conveyor 31, and therefore will not be described except in part.

Figure 5:
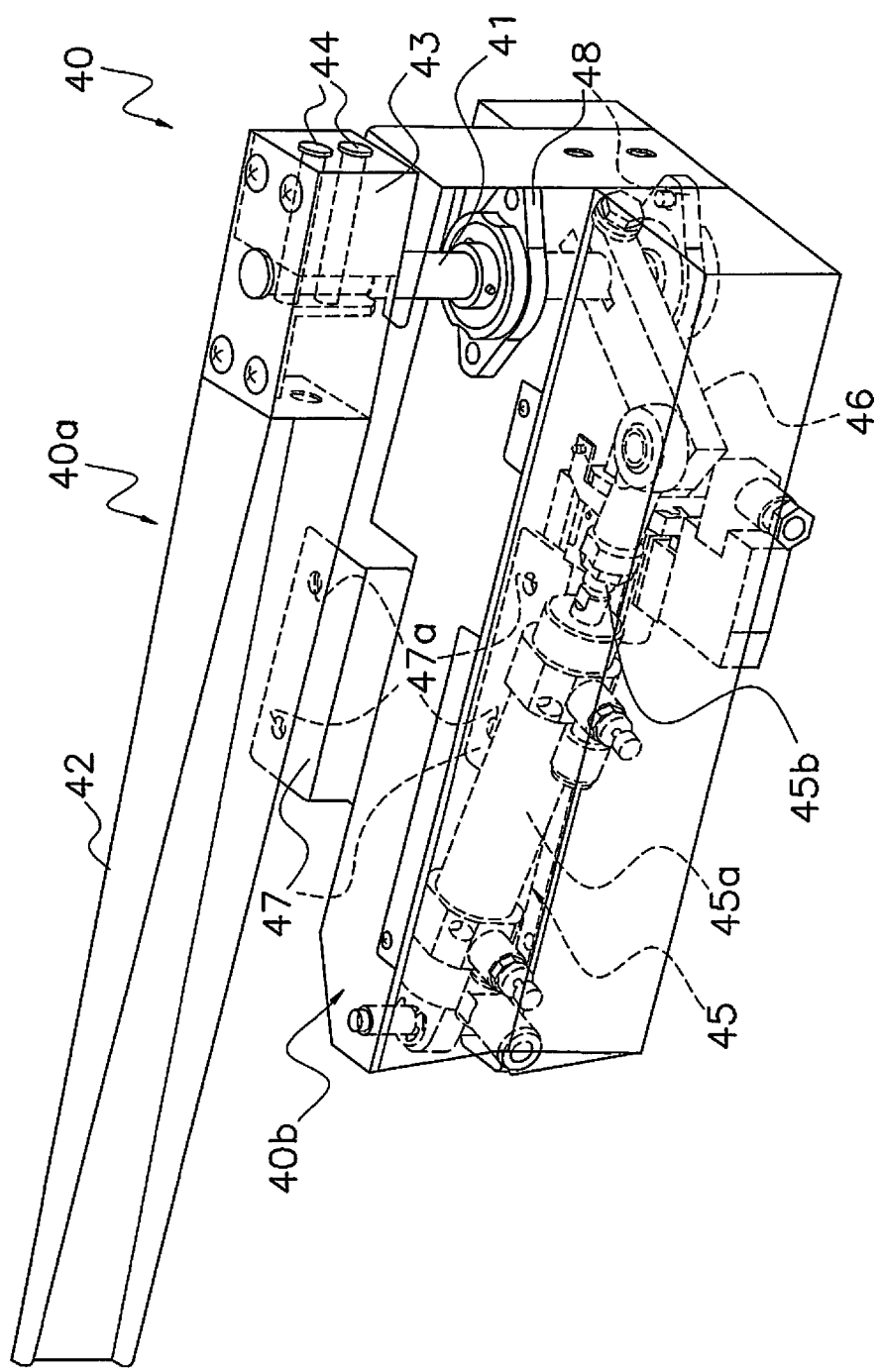
FIG. 5 is a perspective view of a sorting mechanism of the sorting device of the inspection system illustrated in FIG. 1.

As illustrated in FIG. 5, the sorting mechanism 40 has primarily a movable member 40a, a cylinder 45, and a housing 40b.

The movable member 40a is a member being configured to come in contact with a weighing object P conveyed by the sorting conveyor 31 to change the travelling direction of the weighing object P. The movable member 40a includes a rotary shaft 41, an arm member 42, a balance member 43, and connecting pins 44. The arm member 42 is moved by action of the cylinder 45 to move back and forth between a first position (dashed lines in FIG. 6) and a second position (solid lines in FIG. 6). In the first position, the arm member 42 is retracted out of the traveling path and is adjacent to or alongside the flat belt 34, allowing the weighing object P to move freely with the movement of the flat belt in the traveling direction indicated by the arrow A. When the arm member 42 is moved to the second position, the arm member 42 is located directly above portions of the flat belt 34 essentially blocking the traveling path and is in a position to contact the weighing object P.

The cylinder 45 is an example of a drive part for driving the movable member 40a.

The housing 40b is a member for accommodating the cylinder 45. The housing 40b supports the movable member 40a as described hereinafter. The housing 40b is supported by the frame 52 via the rail member 61, as described hereinafter. Specifically, the movable member 40a is supported by the frame 52 via the housing 40b and the rail member 61.

To remove a weighing object P determined to have failed inspection in the weight inspection device 20 from the sorting conveyor 31, the sorting mechanism 40 arranged on the left side of the sorting conveyor 31 (arranged at the top in FIG. 6) drives the cylinder 45 and causes the movable member 40a to rotate as illustrated in FIG. 6, so as to cause the movable member 40a to come in contact with the weighing object P being conveyed by the sorting conveyor 31. In particular, to remove a weighing object P, which has been determined to be less than the allowable minimum weight as a result of inspection in the weight inspection device 20, from the sorting conveyor 31, the sorting mechanism 40 arranged on the left side of the sorting conveyor 31 drives the cylinder 45 and causes the movable member 40a to rotate as indicated by solid lines in FIG. 6, so as to cause the movable member 40a to come in contact with the weighing object P being conveyed by the sorting conveyor 31.

When the movable member 40a comes in contact with the weighing object P, the forward (in the direction of the arrow A in FIG. 1) movement of the weighing object P conveyed by the sorting conveyor 31 is impeded by the arm member 42, and the weighing object P is conveyed along the arm member 42 in the direction of the arrow B in FIG. 6. As a result, the weighing object P is led off of the flat belt 34. The weighing object P led off of the flat belt 34 moves on the ramp 38 and is transferred to the defective-article conveyor not illustrated in the drawing. The sorting mechanism 40 may also push the weighing object P by causing the arm member 42 rotated as indicated by the solid lines in FIG. 6 to move to the original position thereof (the position indicated by double-dashed-chain lines in FIG. 6), and direct the weighing object P off of the flat belt 34.

In the present embodiment, when the weighing object P is determined to have failed inspection in the weight inspection device 20 and the weight of the weighing object P is less than the allowable minimum weight, the arm member 42 of the sorting mechanism 40 on the left side of the sorting conveyor 31 is rotated, and the weighing object P falls to the left of the sorting conveyor 31, as illustrated in FIG. 6. Meanwhile, when the weighing object P is determined to have failed inspection in the weight inspection device 20 and the weight of the weighing object P is greater than the allowable maximum weight, the arm member 42 of the sorting mechanism 40 on the right side (at the bottom in FIG. 6) of the sorting conveyor 31 is rotated similarly to FIG. 6 (however in the opposite rotation direction), and the weighing object P falls to the right of the sorting conveyor 31.

This configuration is described by way of example, and the present invention is not limited to this configuration. For example, the sorting mechanism 40 may be provided only on the left side of the sorting conveyor 31. The sorting mechanism 40 may also direct all weighing objects P determined to have failed inspection in the weight inspection device 20 to the left of the sorting conveyor 31 by rotating the arm member 42, regardless of whether the weight of the weighing objects P is less than the allowable minimum weight or greater than the allowable maximum weight.

The movable member 40a, the cylinder 45, and the housing 40b will be described in detail below.

(2-3-2-1) Movable Member

The movable member 40a includes a rotary shaft 41, the arm member 42, a balance member 43, and connecting pins 44.

(2-3-2-1-1) Rotary Shaft

The rotary shaft 41 is a shaft rotatably driven by the cylinder 45. As illustrated in FIG. 5, the rotary shaft 41 is supported by two bearings 48 fixed to the housing 40b. The rotary shaft 41 is provided in the vicinity of the front end part of the sorting conveyor 31, i.e., in the vicinity of a front end part of the inspection system 1. The rotary shaft 41 and the arm member 42 and balance member 43 attached to the rotary shaft 41 are supported by the housing 40b via the bearings 48. As described hereinafter, the housing 40b is supported by the rail member 61 fixed to the frame 52, and the rotary shaft 41 is therefore supported by the frame 52 via the housing 40b and the rail member 61. The manner in which the rotary shaft 41 is driven as a result of the driving of the cylinder 45 is described later.

The rotary shaft 41 is arranged so as to extend in the vertical direction. In other words, the rotary shaft 41 is arranged so as to extend in a direction perpendicular to the horizontal conveying surface of the sorting conveyor 31. The rotary shaft 41 is also arranged so as to extend in a direction perpendicular to the horizontal conveying surface of the weighing conveyor 21.

The arm member 42 is connected to the rotary shaft 41 so as to extend from the rotary shaft 41 in a radial direction of the rotary shaft 41. The balance member 43 extending from the rotary shaft 41 in a direction opposite to the arm member 42 is connected to the rotary shaft 41. In other words, the arm member 42 is connected to the rotary shaft 41 so as to extend in a horizontal direction. The balance member 43 extending horizontally in the opposite direction from the arm member 42 is connected to the rotary shaft 41.

When the rotary shaft 41 is rotatably driven by the cylinder 45, the arm member 42 and the balance member 43 rotate along a horizontal plane. Specifically, the arm member 42 and the balance member 43 rotate along a plane parallel to the conveying surface of the sorting conveyor 31 and the conveying surface of the weighing conveyor 21.

(2-3-2-1-2) Arm Member

As illustrated in FIG. 5, the arm member 42 is connected to the rotary shaft 41 so as to extend in the radial direction of the rotary shaft 41. When a weighing object P, determined to have passed inspection in the weight inspection device 20, is conveyed by the sorting conveyor 31, the arm member 42 is arranged so as to extend in the conveyance direction (direction of the arrow A in FIG. 1) of the sorting conveyor 31 (see the double-dashed-chain lines in FIG. 6). Meanwhile, when a weighing object P which is determined to have failed inspection in the weight inspection device 20 and to have a weight less than the allowable minimum weight is conveyed by the sorting conveyor 31, the rotary shaft 41 of the sorting mechanism 40 arranged on the left side of the sorting conveyor 31 is driven by the cylinder 45, and the arm member 42 is moved to a position in which the arm member impedes the conveyance of the weighing object P (see the solid lines in FIG. 6). As a result, the arm member 42 comes in contact with the weighing object P, and the weighing object P is removed from the sorting conveyor 31 in the manner described above.

It is preferable that the arm member 42 can rotate as quickly as possible in order to enhance the efficiency of the inspection system 1. It is also preferable that the motive power necessary to drive the rotary shaft 41 is as small as possible for the sake of reducing the size and cost of the sorting mechanism 40. The arm member 42 is therefore designed to be as lightweight as possible while rigidity thereof can be maintained. Aluminum, aluminum alloy, synthetic resin, or another low-density material is therefore commonly used for the arm member 42.

(2-3-2-1-3) Balance Member

As illustrated in FIG. 5, the balance member 43 is connected to the rotary shaft 41 so as to extend in the opposite direction from the arm member 42. The balance member 43 is provided in order to suppress vibration of the rotary shaft 41 in an axial direction due to movement of the arm member 42. In other words, the balance member 43 is provided in order to suppress vibration of the arm member 42 in a direction perpendicular to the conveying surface of the weighing conveyor 21. In particular, the balance member 43 is provided in order to suppress vibration of the arm member 42 in the direction perpendicular to the conveying surface of the weighing conveyor 21, which occurs when the arm member 42 starts to rotate or when the arm member 42 stops rotating.

The adverse effects on the inspection system 1 which is incurred by the vibration of the arm member 42 or the vibration of the rotary shaft 41 in accompany with the vibration of the arm member 42 will be described below. Also, the effect of providing the balance member 43 and the reason why the vibration of the arm member 42 is suppressed by providing the balance member 43 will also be described.

In order to enhance ease of cleaning, when a weight inspection device and a sorting device using a conventional arm-type sorting mechanism (arm-type sorting mechanism which is not provided with a balance member) are supported by a common frame, or more specifically, when a weighing conveyor, a load cell, and a movable member are supported by a common frame, the arm member vibrates due to motion of the arm member, and particularly due to an impulse when the arm member starts to rotate or stops rotating. The vibration is transmitted to the load cell via the rotary shaft and the frame. The problem therefore emerges that the weighing precision of the load cell is adversely affected when the weighing conveyor, the load cell, and the movable member are supported by a common frame. The inspection time of the weight inspection device 20 may be increased (to wait for vibration to be attenuated) in order to enhance the weighing precision of the load cell, but inspection efficiency is then adversely affected.

In contrast, providing the balance member 43 makes it possible to suppress vibration of the arm member 42 which adversely affects the weighing precision of the load cell 28, as described below.

Figure 7:
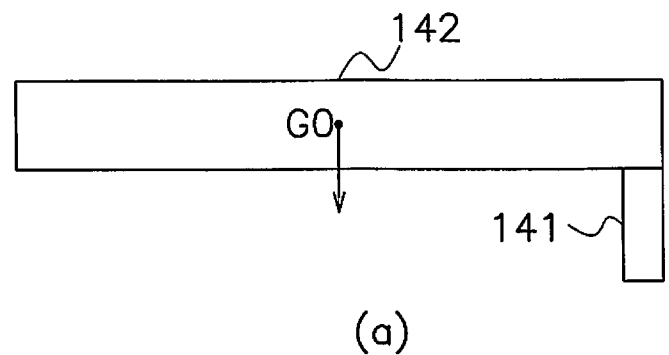
FIG. 7 is a schematic side view of the movable member, illustrating the function of the balance member provided to the sorting mechanism illustrated in FIG. 5.
Figure 7:
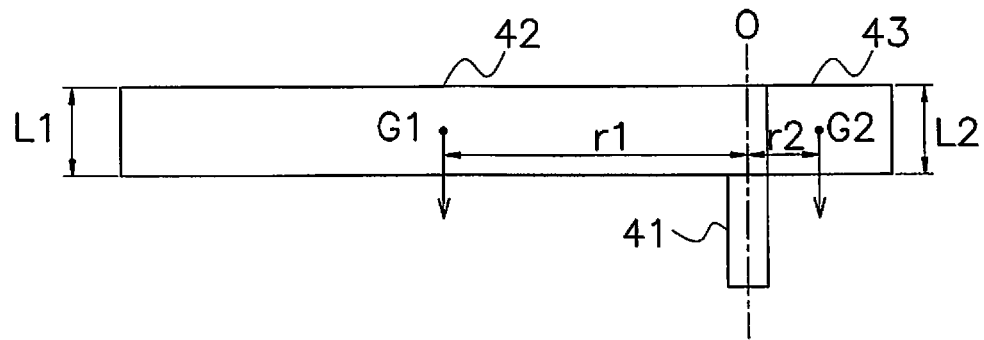

In the conventional arm-type sorting mechanism, a balance member is not provided as illustrated in FIG. 7(a), and in a stationary condition, a bending stress usually acts on a rotary shaft 141 due to gravity acting on an arm member 142. Furthermore, in plan view, there is a large offset between a center-of-gravity position G0 of the arm member 142 and an axial center of the rotary shaft, and a disparity (unbalance) therefore occurs during rotation. Vibration therefore occurs in the arm member 142 in the direction (vertical direction) in which the rotary shaft 141 extends, and the vibration is transmitted to the rotary shaft 141. The vibration of the rotary shaft 141 is transmitted via the frame to the weighing conveyor and the load cell, and adversely affects the inspection precision of the weight inspection device (the weighing precision of the load cell).

Meanwhile, in the sorting mechanism 40 according to the present embodiment, the balance member 43 is provided as illustrated in FIG. 7(b), and bending stress on the rotary shaft 41 can therefore be reduced. Since the balance member 43 is present, when the arm member 42 and the balance member 43 are considered as a single body, the axial center O of the rotary shaft and the center-of-gravity position of the arm member 42 and the balance member 43 can be brought closer together in plan view, and disparity during rotation can therefore be reduced. Vibration of the arm member 42 in the direction (vertical direction) in which the rotary shaft 41 extends can thereby be suppressed. As a result, vibration of the rotary shaft 41 in the axial direction can also be suppressed, and the effect of vibration of the arm member 42 on the weighing precision of the load cell 28 can be suppressed. Specifically, the inventors discovered that vibration of the arm member can be reduced to about one-tenth the amount thereof in some case by using such a configuration.

However, the moment of inertia of the arm member 42 and the balance member 43 about the rotary shaft 41 in the sorting mechanism 40 according to the present embodiment is larger than the moment of inertia of only the arm member 42 about the rotary shaft 41. Specifically, a greater motive power is needed to rotate the arm member 42 and the balance member 43 than is needed to rotate only the arm member 42.

The balance member 43 preferably satisfies conditions such as those described below in view of performing the function of suppressing vibration of the arm member 42.

First, in order to bring the center-of-gravity position of the arm member 42 and the balance member 43, which are considered as a single body, and the axial center O of the rotary shaft 41 closer together in plan view, the product Q2 (=m2×r2) of the weight m2 of the balance member 43 and the distance r2 from the center of gravity G2 of the balance member 43 to the axial center O of the rotary shaft 41 is preferably set so as to approach the product Q1 (=m1×r1) of the weight m1 of the arm member 42 and the distance r1 from the center of gravity G1 of the arm member 42 to the axial center O of the rotary shaft 41. Preferably, the product Q2 should not be too large in order to reduce the motive power. Therefore, preferably, product Q2 is equal to or less than product Q1. More preferably, product Q2 is equal to product Q1 in order to bring the center-of-gravity position of the arm member 42 and balance member 43, which are considered as a single body, and the axial center O of the rotary shaft 41 closer together.

Since there is a strong demand for compactification of the inspection system 1, the sorting mechanism 40 is generally provided at the downstream end in the conveyance direction in which the inspection system 1 conveys the weighing objects P (see FIG. 1). The balance member 43 is therefore preferably formed so as to be as short as possible in the horizontal direction so as not to impede the downstream process. In order to form the balance member 43 shorter in the horizontal direction as well as to bring the product Q2 to approach the product Q1 as described above, it is required that the weight m2 of the balance member 43 is sufficiently large. For example, the weight m2 of the balance member 43 is preferably equal to or larger than 30% of the total of the weight m2 of the balance member 43 and the weight m1 of the arm member 42. The weight m2 of the balance member 43 is more preferably equal to or larger than 50% of the total of the weight m2 of the balance member 43 and the weight m1 of the arm member 42. In the present embodiment, the weight m2 of the balance member 43 is approximately 75% of the total of the weight m2 of the balance member 43 and the weight m1 of the arm member 42.

A dense material is preferably used in the balance member 43 in order to increase the weight m2 of the balance member 43 while forming the balance member 43 so as to be short in the horizontal direction. For example, a material having a density equal to or greater than twice that of the material of the arm member 42 is preferably used in the balance member 43. An iron-based material, for example, is used in the balance member 43.

Furthermore, the balance member 43 is preferably disposed in a plane through which the center of gravity G1 of the arm member 42 passes when the rotary shaft 41 is rotatably driven by the cylinder 45, in order for the arm member 42 and the balance member 43 to be readily balanced about the rotary shaft 41. The center of gravity G2 of the balance member 43 is more preferably disposed in the plane through which the center of gravity G1 of the arm member 42 passes when the rotary shaft 41 is rotatably driven by the cylinder 45. In other words, in a side view, the height of the center of gravity G1 of the arm member 42 and the height of the center of gravity G2 of the balance member 43 preferably correspond.

(2-3-2-1-4) Connecting Pins

The connecting pins 44 are members for connecting the rotary shaft 41 and the balance member 43. As illustrated in FIG. 5, the connecting pins 44 are inserted so as to penetrate through a hole formed in the rotary shaft 41 which pierces the rotary shaft 41 in a radial direction (horizontal direction) and a hole formed in the balance member 43 which pierces the balance member 43 in the horizontal direction.

(2-3-2-2) Cylinder

The cylinder 45 is an example of a drive part. When a weighing object P which has failed inspection in the weight inspection device 20 is conveyed by the sorting conveyor 31, the cylinder 45 drives the movable member 40a so as to cause the movable member 40a to come in contact with the weighing object P. In other words, when a weighing object P which has failed inspection in the weight inspection device 20 is conveyed by the sorting conveyor 31, the cylinder 45 drives the arm member 42 so as to cause the arm member 42 to come in contact with the weighing object P.

The cylinder 45 is an air cylinder driven by compressed air. The cylinder 45 is driven by compressed air, whereby a rod 45b advances and retreats with respect to a cylinder body 45a. One end of a rod-shaped link member 46 is connected to a distal end of the rod 45b. The other end of the link member 46 is connected to the rotary shaft 41 of the movable member 40a.

The movement of the rotary shaft 41 and the arm member 42 at the time when the cylinder 45 is driven will be described using the sorting mechanism 40 arranged on the left side of the sorting conveyor 31 as an example. For the sorting mechanism 40 arranged on the right side of the sorting conveyor 31, the movement is similar except that the rotary shaft 41 and the arm member 42 rotate in the opposite direction when the cylinder 45 is driven. This movement therefore will not be described.

FIG. 5 depicts a state in which the rod 45b of the cylinder 45 in the sorting mechanism 40 arranged on the left side of the sorting conveyor 31 is fully retreated with respect to the cylinder body 45a (the rod 45b is retracted within the cylinder body 45a). As illustrated in FIG. 5, in a state where the rod 45b is fully retreated with respect to the cylinder body 45a, the arm member 42 is disposed parallel relative to the conveyance direction of the sorting conveyor 31. In this state, the arm member 42 does not come in contact with a weighing object P conveyed by the sorting conveyor 31 (see the arm member 42 indicated by double-dashed-chain lines in the movable member 40a at the top of FIG. 6). When the cylinder 45 is driven so that the rod 45b advances with respect to the cylinder body 45a (so that the rod 45b exits from the cylinder body 45a) from the state illustrated in FIG. 5, the rotary shaft 41 is rotatably driven counterclockwise in plan view. As a result, the arm member 42 is also rotatably driven counterclockwise in plan view and positioned so as to come in contact with a weighing object P conveyed by the sorting conveyor 31 (see the arm member 42 indicated by solid lines in the movable member 40a at the top of FIG. 6). When the cylinder 45 is driven in this state so that the rod 45b retreats with respect to the cylinder body 45a (so that the rod 45b enters into the cylinder body 45a), the rotary shaft 41 is rotatably driven clockwise in plan view. As a result, the arm member 42 is also rotatably driven clockwise in plan view and returns to the state illustrated in FIG. 5.

(2-3-2-3) Housing

The housing 40b is a member for accommodating the cylinder 45.

As illustrated in FIG. 5, the bearings 48 for supporting the rotary shaft 41 of the movable member 40a are provided on a top surface and a bottom surface of the housing 40b. Specifically, the movable member 40a is supported by the housing 40b via the bearings 48. As illustrated in FIG. 5, rail fixing parts 47 for fixing the housing 40b to the rail member 61 described hereinafter are provided in two locations at a top and bottom of the housing 40b. Holes 47a (see FIG. 5) for inserting bolts 47b (see FIG. 9) are formed in the rail fixing parts 47. The bolts 47b inserted in the holes 47a are screwed with bolt fixing members 61b in rails 61a provided in the rail member 61 described hereinafter, and the rail fixing parts 47 are thereby fixed to the rail member 61. Specifically, the housing 40b is supported by the rail member 61 via the rail fixing parts 47. As described hereinafter, the rail member 61 is supported by the frame 52. Specifically, the movable member 40a is supported by the frame 52 via the housing 40b and the rail member 61.

(2-4) Support Column

The support column 50 is a member for supporting the frame 52 described hereinafter. As illustrated in FIG. 1, the support column 50 has a support column body 51a and a base 51b.

Figure 8:
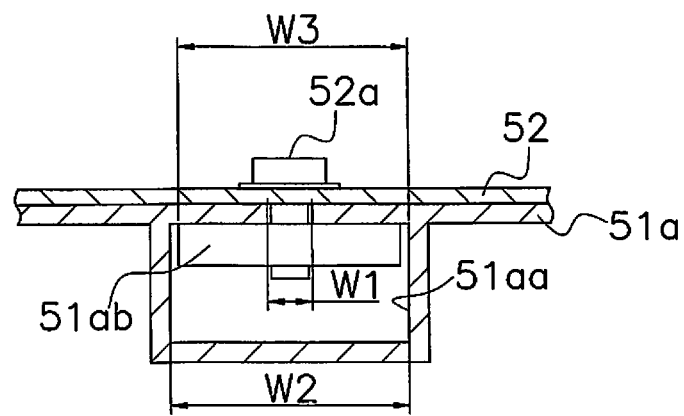
FIG. 8 is a schematic sectional view from above, illustrating a horizontal cross-section of a support column body of the inspection system illustrated in FIG. 1. In particular.

The support column body 51a is a member extending upward from the base 51b. The support column body 51a is formed in a hollow rectangular cylindrical shape. Rails 51aa extending in the vertical direction are formed in two locations each on a front surface and a rear surface of the support column body 51a (see FIG. 1). The rails 51aa are formed so as to extend from a top end to a bottom end of the support column body 51a. The rails 51aa are C-shaped grooves such as illustrated in FIG. 8. In other words, the rails 51aa are grooves formed so that the width W2 of an inside of the rails 51aa is greater than the width W1 of an opening of the rails 51aa. Bolt fixing members 51ab are disposed in the rails 51aa. The bolt fixing members 51ab are formed so that the width W3 thereof is greater than the width W1 of the openings of the rails 51aa, and are therefore configured so that the bolt fixing members 51ab do not come out of the openings of the rails 51aa. The bolt fixing members 51ab can freely move up and down through the insides of the rails 51aa. Female threads for screwing with bolts 52a to fix the support column body 51a and the frame 52 described hereinafter are formed in the bolt fixing members 51ab, and bolts are screwed into the female threads, whereby the support column body 51a and the frame 52 are fixed. Since the bolt fixing members 51ab can freely move through the inside of the rails 51aa as described above, the attachment position (attachment height) of the frame 52 can be adjusted by changing the fixed position with the bolts 52a. The heights of the introduction conveyor frame 12, the weighing conveyor frame 22, and the sorting conveyor frame 32 supported by the frame 52 can be adjusted at once by changing the attachment position of the frame 52 relative to the support column body 51a. Specifically, the heights of the conveying surfaces of the introduction conveyor 11, the weighing conveyor 21, and the sorting conveyor 31 can be adjusted at once by changing the attachment position of the frame 52 relative to the support column body 51a.

The shape of the rails 51aa or the shape of the bolt fixing members 51ab is presented herein for showing an example of the method for fixing the frame 52 and the support column body 51a, and is not limited to the shape described above. However, the frame 52 is preferably configured so that the position of attachment (height of attachment) thereof to the support column body 51a is adjustable.

The base 51b is U-shaped as illustrated in FIG. 1, and supports the support column body 51a. The base 51b has four legs 51ba protruding downward.

(2-5) Frame

The frame 52 is an example of a common frame. The introduction conveyor 11, the weighing conveyor 21, the sorting conveyor 31, the load cell 28, and the movable member 40a are supported by the frame 52. Here, being supported by the frame 52 includes not only being directly supported by the frame 52, but also being indirectly supported via other members supported by the frame 52.

The frame 52 primarily comprises two first members 53 and one second member 54.

The first members 53 are beams extending in the horizontal direction. One of the first members 53 is fixed to a front surface of the support column body 51a, and the other first member 53 is fixed to a rear surface of the support column body 51a. The first members 53 are fixed so as to extend horizontally to the right from the front surface and rear surface of the support column body 51a. The first members 53 are each fixed at two locations on the front surface or the rear surface of the support column body 51a. Specifically, the first members 53 are fixed to the support column body 51a by screwing the bolts 52a in the bolt fixing members 51ab provided to each of the rails 51aa formed in two locations on the front surface or the rear surface of the support column body 51a. The support column body 51a and the frame 52 are fixed together in the manner described above.

The second member 54 is a beam extending horizontally in a front-rear direction. One end of the second member 54 is fixed to an intermediate portion (intermediate portion in a left-right direction) of the first member 53 extending to the right from the rear surface of the support column body 51a. The other end of the second member 54 is fixed to an intermediate portion (intermediate portion in the left-right direction) of the first member 53 extending to the right from the front surface of the support column body 51a. Specifically, the frame 52 comprising two first members 53 and one second member 54 is formed so as to be H-shaped in plan view. The support column 55 for supporting the load cell 28 via the bracket 29 is provided to the second member 54. Specifically, the load cell 28 is supported by the frame 52. Furthermore, the weighing conveyor 21 supported by the load cell 28 as described above is also supported by the frame 52.

Figure 9:
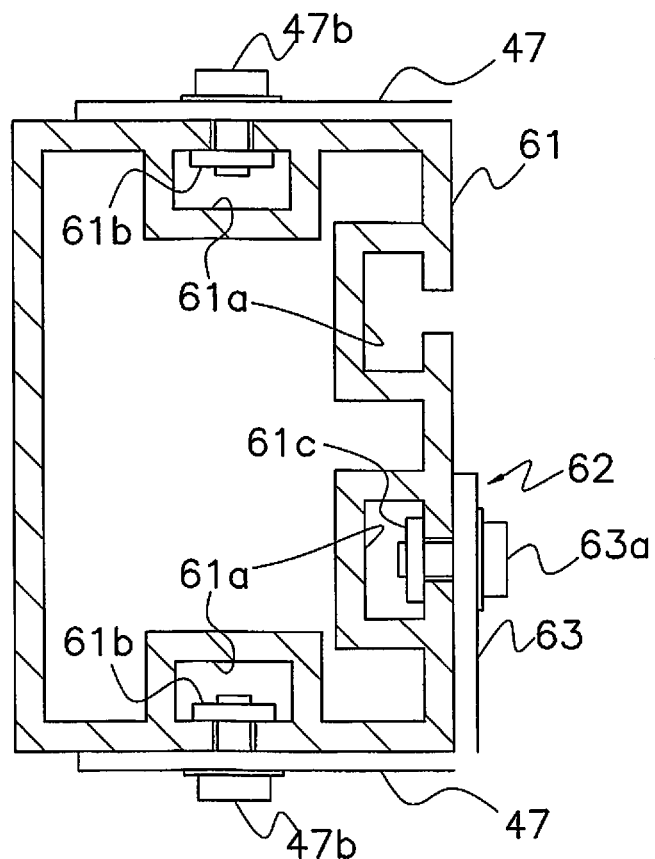
FIG. 9 is a schematic sectional view from the rear, illustrating a perpendicular cross-section of the rail member arranged on the left side in the inspection system illustrated in FIG. 1.

Two rail members 61 extending in the front-rear direction are fixed to the first member 53. One rail member 61 is disposed on a left side of the conveyors 11, 21, 31, and the other rail member 61 is disposed on a right side of the conveyors 11, 21, 31. The rail members 61 are formed in a hollow rectangular cylindrical shape (see FIG. 9). A rail 61a extending in the front-rear direction from a rear end part of the rail member 61 to a front end part thereof is formed in one location on each of a top surface and a bottom surface of the rail member 61 (see FIG. 9). Rails 61a extending in the front-rear direction from the rear end part of the rail member 61 to the front end part thereof are formed in two locations on an inside surface of the rail member 61 (see FIG. 9). Among lateral surfaces of the rail member 61, the inside surface of the rail member 61 means a surface facing the conveyors 11, 21, 31. Specifically, the "inside surface" of the rail member 61 refers to a right side surface in the case of the rail member 61 disposed on the left side of the conveyors 11, 21, 31, and refers to a left side surface in the case of the rail member 61 disposed on the right side of the conveyors 11, 21, 31. As illustrated in FIG. 9, each of the rails 61a formed in the rail member 61 is a C-shaped groove. The shape of the rails 61a is the same as the shape of the rails formed in the support column body 51a of the support column 50, and therefore will not be described.

A bolt fixing member 61b capable of freely moving in the front-rear direction through the inside of each rail 61a is provided in each of the rails 61a on the top surfaces and bottom surfaces of the rail members 61. The bolt fixing members 61b are formed so that the width thereof is greater than the width of the openings of the rails 61a on the top surfaces and bottom surfaces of the rail members 61, and are configured so that the bolt fixing members 61b do not come out of the openings of the rails 61a, the same as the bolt fixing members 51ab described above. Female threads for screwing with bolts 47b to fix the housing 40b to the rail members 61 are formed in the bolt fixing members 61b. The bolts 47b are screwed into the female threads of the bolt fixing members 61b, and the two top- and bottom-located rail fixing parts 47 are fixed to the rail members 61, whereby the housing 40b and the rail members 61 are fixed.

The method described above for fixing the rail members 61 and the housing 40b is presented as an example and is not limited to this. However, the housing 40b and the rail members 61 are preferably fixed by a method in which the attachment position of the housing 40b with respect to the rail members 61 is adjustable.

Two bolt fixing members 61c for fixing the sub-frame 62 which supports the sorting conveyor 31 via the case 36 are provided to each of the rails 61a disposed at the bottom of the inside surfaces of the rail members 61 (see FIG. 9). The bolt fixing members 61c are formed so that the width thereof is greater than the width of the openings of the rails 61a on the inside surfaces of each of the rail members 61, and are configured so that the bolt fixing members 61c do not come out of the openings of the rails 61a, the same as the bolt fixing members 51ab described above. Female threads for screwing with bolts 63a to fix the sub-frame 62 which supports the sorting conveyor 31 to the rail members 61 are formed in the bolt fixing members 61c.

The sub-frame 62 comprises primarily two first members 63 and one second member 64 (see FIG. 4).

The first members 63 are beams extending in the horizontal direction. One end of each of the first members 63 is fixed to the rail member 61 arranged on the left side of the conveyors 11, 21, 31, and the other end of each of the first members 63 is fixed to the rail member 61 arranged on the right side of the conveyors 11, 21, 31. The first members 63 and the rail members 61 are fixed by screwing the bolts 63a into the female threads of the bolt fixing members 61c provided to the rails 61a of the rail members 61.

The method described above for fixing the sub-frame 62 and the rail members 61 is presented as an example and is not limited to this. However, the sub-frame 62 and the rail members 61 are preferably fixed by a method in which the attachment position of the sub-frame 62 with respect to the rail members 61 is adjustable.

The second member 64 is a beam extending horizontally in the front-rear direction. One end of the second member 64 is fixed to an intermediate portion (intermediate portion in the left-right direction) of the first member 63 that is arranged on the rear side among the two first members 63. The other end of the second member 64 is fixed to an intermediate portion (intermediate portion in the left-right direction) of the first member 63 that is arranged on the front side among the two first members 63. Specifically, the sub-frame 62 comprising two first members 63 and one second member 64 is formed so as to be H-shaped in plan view. The second member 64 supports the sorting conveyor 31 via the case 36 and the conveyor attachment brackets 37.

Two bolt fixing members 61c for fixing the sub-frame 62 which supports the introduction conveyor 11 via the case 16 are also provided to each of the rails 61a disposed at the bottom of the inside surfaces of the rail members 61. Female threads for screwing with bolts 63a for fixing the sub-frame 62 which supports the introduction conveyor 11 are formed in the bolt fixing members 61c.

(2-6) Control Unit

As illustrated in FIG. 2, the control unit 80 is connected to each part of the inspection system 1 including the introduction conveyor motor 15, the weighing conveyor motor 25, the sorting conveyor motor 35, the load cell 28, and a solenoid valve 45c. The solenoid valve 45c is a valve for controlling the supplying/stopping of compressed air for driving the cylinder 45.

The control unit 80 (also referred to as a controller) includes primarily a storage region comprising ROM, RAM, an HDD (hard disk), a CPU, control software and/or a computer program and the like. The control unit 80 is programmed or otherwise configured to electronically control each of the introduction device 10, the weight inspection device 20, and the sorting device 30 by causing a CPU to execute the computer program stored in the storage region (i.e., the ROM, RAM and/or HDD). Specifically, the control unit 80 constitutes a portion of the introduction device 10, the weight inspection device 20, and the sorting device 30. The control unit 80 also functions as a general control unit for comprehensively controlling the introduction device 10, the weight inspection device 20, and the sorting device 30.

Specifically, the control unit 80 controls the movement of the conveyor motors 15, 25, 35 based on the parameters (conveyor speed, number of inspections per unit time (throughput), length of the weighing conveyor in the front-rear direction, and other parameters) which are set in advance, for example.

In order to suppress adverse effects on the weighing precision of the load cell 28 of the weight inspection device 20, the control unit 80 usually controls the conveyor motors 15, 25, 35 so as to make the conveyance speeds of the introduction conveyor 11, the weighing conveyor 21, and the sorting conveyor 31 the same so that impacts do not occur when a weighing object P is transferred between conveyors. When an abnormality occurs in a later (downstream) process of the inspection system 1, the control unit 80 stops all of the conveyor motors 15, 25, 35.

The introduction conveyor 11 is controlled so as to convey a weighing object P at a speed (constant speed) greater than the conveyance speed of a conveyor (conveyor for supplying the weighing object P to the introduction conveyor 11) on the upstream side of the inspection system 1. The conveyance speed of the introduction conveyor 11 is controlled in this way so that a distance (pitch) between weighing objects P is set to at least a predetermined distance to avoid that the next weighing object P is supplied to the weighing conveyor 21 while the weighing conveyor 21 is weighing a weighing object P. The conveyance speed of the introduction conveyor 11 is set on the basis of a known minimum distance (minimum pitch) between weighing objects P supplied from an earlier (upstream) process to the inspection system 1.

For example, the control unit 80 as a portion of the weight inspection device 20 determines whether the weight of a weighing object P conveyed by the weighing conveyor 21 is within the allowable weight range (equal to or greater than the allowable minimum weight and equal to or less than the allowable maximum weight) using the result of weighing by the load cell 28. The control unit 80 as a portion of the weight inspection device 20 determines that the weighing object P passes inspection when the weight of the weighing object P is within the allowable weight range. The control unit 80 determines that the weighing object P fails inspection when the weight of the weighing object P conveyed by the weighing conveyor 21 is outside the allowable weight range (lighter than the allowable minimum weight or heavier than the allowable maximum weight). Here, when the weighing object P conveyed by the weighing conveyor 21 is determined to have failed inspection, the control unit 80 also determines whether the weighing object P is lighter than the allowable minimum weight or the weighing object P is heavier than the allowable maximum weight.

When a weighing object P determined to have passed inspection based on the result of inspection by the weight inspection device 20 is conveyed by the sorting conveyor 31, the control unit 80 as a portion of the sorting device 30 does not drive the cylinder 45 and allows the weighing object P to be conveyed to a front end part of the sorting conveyor 31. When a weighing object P determined to have failed inspection and determined to have a weight less than the allowable minimum weight as a result of inspection by the weight inspection device 20 is conveyed by the sorting conveyor 31, the control unit 80 drives the cylinder 45 of the sorting mechanism 40 arranged on the left side of the sorting conveyor 31 to rotate the movable member 40*a* and to drop the weighing object P to the left side of the sorting conveyor 31. When a weighing object P determined to have failed inspection and determined to have a weight greater than the allowable maximum weight as a result of inspection by the weight inspection device 20 is conveyed by the sorting conveyor 31, the control unit 80 drives the cylinder 45 of the sorting mechanism 40 arranged on the right side of the sorting conveyor 31 to rotate the movable member 40*a* and to drop the weighing object P to the right side of the sorting conveyor 31.

In the present embodiment, the control unit 80 drives the cylinder 45 (operates the solenoid valve 45*c*) and rotatably drives the movable member 40*a* even while the weight of the weighing object P conveyed by the weighing conveyor 21 is being measured by the load cell 28. Good inspection efficiency is therefore obtained. Since the vibration of the arm member 42 in the vertical direction (axial direction of the rotary shaft 41) is also suppressed by the balance member 43 as described above, the weighing precision of the load cell 28 is not prone to be adversely affected when the movable member 40*a* is rotatably driven.

(3) Features (3-1)

The inspection system 1 according to the present embodiment is provided with the weight inspection device 20, the sorting device 30, and the frame 52 as a common frame. The weight inspection device 20 includes the weighing conveyor 21 for conveying a weighing object P, and the load cell 28 as a weighing instrument for weighing the weighing object P conveyed by the weighing conveyor 21. The weight inspection device 20 inspects the weighing object P using the result of weighing by the load cell 28. The sorting device 30 includes the sorting conveyor 31, the movable member 40*a*, and the cylinder 45 as a drive part. The sorting conveyor 31 is arranged downstream of the weighing conveyor 21. The movable member 40*a* in configured to come in contact with the weighing object P conveyed by the sorting conveyor 31 to change the traveling direction of the weighing object P. The cylinder 45 drives the movable member 40*a* based on the result of inspection by the weight inspection device 20 so as to cause the movable member 40*a* to come in contact with the weighing object P. The frame 52 supports the weighing conveyor 21, the load cell 28, and the movable member 40*a*.

Here, since the weighing conveyor 21 and load cell 28 of the weight inspection device 20 and the movable member 40*a* of the sorting device 30 are fixed to the frame 52, which is a common frame, a periphery of the legs (periphery of the base 51*b*) of the inspection system 1 can have a simple structure relative to a configuration in which the weight inspection device 20 and the sorting device 30 have individual frames. As a result, a compact inspection system 1 having excellent ease of cleaning can be provided.

(3-2)

In the inspection system 1 according to the present embodiment, the movable member 40*a* includes the rotary shaft 41, the arm member 42, and the balance member 43. The rotary shaft 41 is supported by the frame 52 and is rotatably driven by the cylinder 45. The arm member 42 extends from the rotary shaft 41 in the radial direction of the rotary shaft 41 and is configured to come in contact with the weighing object P when the rotary shaft 41 is rotatably driven by the cylinder 45. The balance member 43 extends from the rotary shaft 41 in the opposite direction from the arm member 42.

Here, as the balance member 43 extending in the opposite direction from the arm member 42 with respect to the rotary shaft 41 is provided, the vibration of the arm member 42 in the vertical direction (axial direction of the rotary shaft 41) can be suppressed, and the vibration of the rotary shaft 41 in the axial direction can be suppressed, as described above. The inspection precision of the weight inspection device 20 (weighing precision of the load cell 28) is therefore not prone to be adversely affected even though the weighing conveyor 21, the load cell 28 and the rotary shaft 41 of the arm member 42 are supported by the common frame 52. As a result, an inspection system 1 having excellent ease of cleaning can be provided while inspection precision and inspection efficiency are maintained (without increasing the time taken for measurement by the weight inspection device 20).

(3-3)

In the inspection system 1 according to the present embodiment, the rotary shaft 41 extends in the direction perpendicular to the conveying surface of the sorting conveyor 31. The arm member 42 and the balance member 43 rotate along a plane parallel to the conveying surface of the sorting conveyor 31.

Here, the arm member 42 and the balance member 43 rotate along a plane parallel to the conveying surface of the sorting conveyor 31, and a large torsional moment therefore acts on the rotary shaft 41. However, as the balance member 43 is provided, the vibration of the arm member 42 in the vertical direction (axial direction of the rotary shaft 41) that accompanies the movement of the arm member 42 can be suppressed, and the vibration of the rotary shaft 41 in the axial direction can be suppressed. The inspection precision of the weight inspection device 20 is therefore not prone to be adversely affected even though the weighing conveyor 21, the load cell 28, and the rotary shaft 41 of the arm member 42 are supported by the common frame 52. As a result, an inspection system 1 having excellent ease of cleaning can be provided while inspection precision and inspection efficiency are maintained.

(3-4)

In the inspection system 1 according to the present embodiment, the rotary shaft 41 extends in the direction perpendicular to the conveying surface of the weighing conveyor 21. The balance member 43 intersects the plane through which the center of gravity G1 of the arm member 42 passes when the rotary shaft 41 is rotatably driven by the cylinder 45.

Here, as the balance member 43 is disposed so as to intersect the plane through which the center of gravity G1 of the arm member 42 passes, and the arm member 42 and the balance member 43 are therefore readily balanced about the rotary shaft 41. Vibration of the arm member 42 in the vertical direction (axial direction of the rotary shaft 41) that accompanies the rotation of the arm member 42 can be suppressed, and the vibration of the rotary shaft 41 in the axial direction can be suppressed. In other words, it is possible to suppress vibration of the rotary shaft 41 in the direction perpendicular to the conveying surface of the weighing conveyor 21 that occurs when the arm member 42 is rotated. The inspection precision of the weight inspection device 20 is therefore not prone to be adversely affected even though the weighing conveyor 21, the load cell 28, and the rotary shaft 41 of the arm member 42 are supported by the common frame 52. As a result, an inspection system 1 having excellent ease of cleaning can be provided while inspection precision and inspection efficiency are maintained.

In the inspection system 1 according to the present embodiment, the center of gravity G2 of the balance member 43 is disposed in the plane through which the center of gravity G1 of the arm member 42 passes when the rotary shaft 41 is rotatably driven by the cylinder 45.

Here, it is particularly easy for the arm member 42 and the balance member 43 to be balanced about the rotary shaft 41, and it is particularly easy to suppress vibration of the rotary shaft 41 in the axial direction thereof that accompanies the rotation of the arm member 42. As a result, an inspection system 1 having excellent ease of cleaning can be provided while inspection precision and inspection efficiency are maintained.

(3-5)

In the inspection system 1 according to the present embodiment, the balance member 43 is provided in order to suppress vibration of the arm member 42 in the direction perpendicular to the conveying surface of the weighing conveyor 21.

The inspection precision of the weight inspection device 20 is therefore not prone to be adversely affected even though the weighing conveyor 21, the load cell 28, and the rotary shaft 41 of the arm member 42, are supported by the common frame 52. As a result, an inspection system 1 having excellent ease of cleaning can be provided while inspection precision and inspection efficiency are maintained.

(3-6)

In the inspection system 1 according to the present embodiment, the moment of inertia of the arm member 42 and the balance member 43 about the rotary shaft is larger than the moment of inertia of only the arm member 42 about the rotary shaft 41.

Since a larger drive power is usually needed in the drive part when the moment of inertia becomes larger, a small moment of inertia is preferred. However, providing the balance member 43 makes the inspection precision of the weight inspection device 20 less prone to be adversely affected, and the inspection efficiency of the inspection system 1 can therefore be enhanced relative to a configuration in which the balance member 43 is not provided. As a result, an inspection system 1 having excellent ease of cleaning can be provided while inspection precision and inspection efficiency are maintained.

(3-7)

In the inspection system 1 according to the present embodiment, the product Q2 of the weight m2 of the balance member 43 and the distance r2 from the center of gravity G2 of the balance member 43 to the axial center O of the rotary shaft 41 is set so as to approach the product Q1 of the weight m1 of the arm member 42 and the distance r1 from the center of gravity G1 of the arm member 42 to the axial center O of the rotary shaft 41.

Disparity (unbalance) of the rotary shaft 41 is thereby easily overcome, vibration of the arm member 42 in the vertical direction (axial direction of the rotary shaft 41) that accompanies the rotation of the arm member 42 can be suppressed, and vibration of the rotary shaft 41 in the axial direction can be suppressed. Specifically, the inspection precision of the weight inspection device 20 is not prone to be adversely affected even though the weighing conveyor 21, the load cell 28, and the rotary shaft 41 of the arm member 42 are supported by the common frame 52. As a result, an inspection system 1 having excellent ease of cleaning can be provided while inspection precision and inspection efficiency are maintained.

(3-8)

The weight m2 of the balance member 43 is preferably equal to or greater than 30% of the total of the weight m2 of the balance member 43 and the weight m1 of the arm member 42. The weight m2 of the balance member 43 is more preferably equal to or greater than 50% of the total of the weight m2 of the balance member 43 and the weight m1 of the arm member 42. In the inspection system 1 according to the present embodiment, the weight m2 of the balance member 43 is approximately 75% of the total of the weight m2 of the balance member 43 and the weight m1 of the arm member 42.

Here, the balance member 43 having an adequate weight is provided, whereby disparity (unbalance) of the rotary shaft is easily overcome, vibration of the arm member 42 in the vertical direction (axial direction of the rotary shaft 41) that accompanies the rotation of the arm member 42 can be suppressed, and vibration of the rotary shaft 41 in the axial direction can be suppressed. Specifically, the inspection precision of the weight inspection device 20 is not prone to be adversely affected even though the weighing conveyor 21, the load cell 28, and the rotary shaft 41 of the arm member 42 are supported by the common frame 52. As a result, an inspection system 1 having excellent ease of cleaning can be provided while inspection precision and inspection efficiency are maintained.

(3-9)

In the inspection system 1 according to the present embodiment, the timing at which a weighing object P is weighed by the load cell 28 and the timing at which the rotary shaft 41 is driven by the cylinder 45 overlap.

Here, weighing by the load cell 28 is performed while the rotary shaft 41 is being driven, and high inspection efficiency can therefore be maintained. Since the vibration of the arm member 42 in the vertical direction (axial direction of the rotary shaft 41) is suppressed by the balance member 43, the weighing precision of the load cell 28 is not prone to be adversely affected when the movable member 40a is rotatably driven.

(3-10)

In the inspection system 1 according to the present embodiment, the frame 52 supports the sorting conveyor 31.

Here, the periphery of the legs (periphery of the base 51b) of the inspection system 1 can have a simple structure relative to a configuration in which the weight inspection device 20 and the sorting device 30 have individual frames. As a result, a compact inspection system 1 having excellent ease of cleaning can be provided.

Further, since the weighing conveyor 21 and the sorting conveyor 31 are supported by the common frame 52, the heights of the weighing conveyor 21 and the sorting conveyor 31 can be changed at once merely by changing the attachment position of the frame 52 relative to the support column body 51a, and it is possible to save the trouble of separately adjusting the height of the weighing conveyor 21 and the height of the sorting conveyor 31.

(4) Modifications

Modifications of the present embodiment are described below. A plurality of modifications may also be combined, as appropriate.

(4-1) Modification 1A.

In the inspection system 1 of the embodiment described above, the introduction device 10, the weight inspection device 20, and the sorting device 30 are supported by the common frame 52, but the present invention is not limited to this configuration. For example, an inspection system 1 not having the introduction device 10 may be configured.

(4-2) Modification 1B

In the embodiment described above, a cylinder 45 driven by compressed air is used as the drive part, but the present invention is not limited to this configuration. For example, the drive part may rotate the rotary shaft 41 through use of a motor.

(4-3) Modification 1C

In the embodiment described above, the sorting device 30 conveys weighing objects P determined to have passed inspection by the weight inspection device 20 to the front end part of the inspection system 1 by the sorting conveyor 31, and sorts weighing objects P determined to have failed inspection by the weight inspection device 20 to weighing objects P having a weight less than the allowable minimum weight and weighing objects P having a weight greater than the allowable maximum weight using the two sorting mechanisms 40. However, the present invention is not limited to this configuration.

For example, the sorting device 30 may be configured so as to also use the result of a foreign substance inspection performed upstream of the inspection system 1, and convey a weighing object P determined to have passed the weight inspection and foreign substance inspection to the front end part of the inspection system 1 by the sorting conveyor 31, and sorts the weighing objects P into weighing objects P determined to have failed the foreign substance inspection and weighing objects P determined to have failed the weight inspection using the two sorting mechanisms 40.

(4-4) Modification 1D

Figure 10:
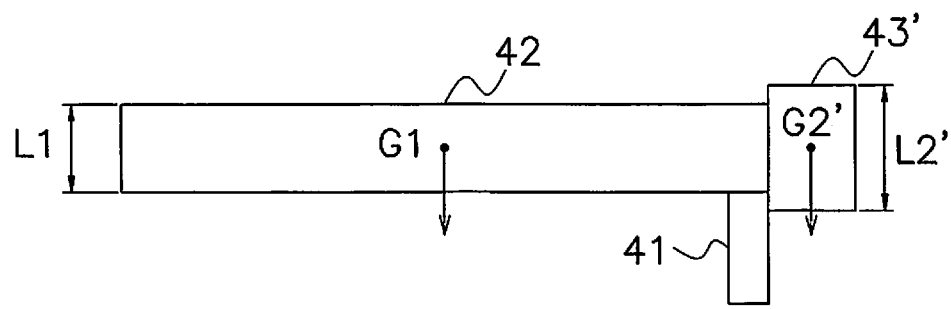
FIG. 10 is a schematic side view of the movable member, illustrating an example of the shape of the balance member according to Modification 1D.

In the embodiment described above, the length L1 of the arm member 42 in the vertical direction and the length L2 of the balance member 43 in the vertical direction are the same (see FIG. 7), but the present invention is not limited to this configuration. For example, as shown in FIG. 10, a balance member 43' may be formed to have a length L2' in the vertical direction greater than the length L1 of the arm member 42 in the vertical direction. However, in this case as well, the center of gravity G2' of the balance member 43' is preferably disposed in the plane through which the center of gravity G1 of the arm member 42 passes when the rotary shaft 41 is rotatably driven by the cylinder 45.

(4-5) Modification 1E

In the embodiment described above, weighing objects P determined to have failed inspection by the weight inspection device 20 are sorted by the sorting device 30 and subsequently conveyed to a defective-article conveyor, but the present invention is not limited to this configuration. For example, weighing objects P determined to have failed inspection by the weight inspection device 20 may be sorted by the sorting device 30 and directed to a defective-article recovery box.

(4-6) Modification 1F

In the embodiment described above, the frame 52 is configured from the first members 53 and the second member 54, but the present invention is not limited to this configuration. For example, the frame 52 may be formed as an integrated member. The same applies for the sub-frame 62.

In the embodiment described above, the frame 52 is formed so as to be H-shaped, but the present invention is not limited to this configuration. The frame 52 may be formed having any shape suitable for supporting components such as the load cell 28, the weighing conveyor 21, and the movable member 40a. The sub-frame 62 is likewise not limited to being H-shaped, and may be formed having any shape suitable for supporting a component such as the introduction conveyor 11 or the sorting conveyor 31.

(4-7) Modification 1G

In the embodiment described above, the control unit 80 sets the conveyors 11, 21, 31 to the same conveyance speed, but the present invention is not limited to this configuration. However, as described above, the conveyors preferably have the same conveyance speed so as not to adversely affect the weighing precision of the load cell 28 of the weight inspection device 20.

In the embodiment described above, the control unit 80 is described as stopping all of the conveyor motors 15, 25, 35 when a problem occurs in a later (downstream) process, but the control unit 80 may also control the conveyor motors 15, 25, 35 individually. For example, the control unit 80 may perform control to stop the movement of the weighing conveyor motor 25 in a case in which the weighing conveyor 21, for some reason, comes to supply the next weighing object P to the sorting conveyor 31 while the movable member 40a is removing a weighing object P determined to have failed inspection by the weight inspection device 20 from the sorting conveyor 31.

What is claimed is:

1. An inspection system comprising:
   a weight inspection device including a weighing conveyor for conveying a weighing object and a weighing instrument for weighing the weighing object conveyed by said weighing conveyor, the weight inspection device inspecting the weighing object using the result of weighing by the weighing instrument;
   a sorting device including a sorting conveyor arranged downstream of the weighing conveyor, a movable member being configured to come in contact with the weighing object conveyed by said sorting conveyor to change a traveling direction of the weighing object, and a drive part for driving said movable member based on the result of inspection by the weight inspection device so as to cause the movable member to come in contact with the weighing object;
   a common frame supporting the weighing conveyor, the weighing instrument, and the movable member; and
   a controller connected to the weight inspection device and the sorting device,
   the movable member of the sorting device including:
   a rotary shaft supported by the common frame and rotatably driven by the drive part, the rotary shaft defining an axial center thereof;
   an arm member, extending from the rotary shaft in a radial direction of the rotary shaft, being configured to come in contact with the weighing object when the rotary shaft is rotatably driven by the drive part, the arm member having a center of gravity; and
   a balance member extending from the rotary shaft in an opposite direction from the arm member, the balance member also having a center of gravity such that a distance from the center of gravity of the arm member to the axial center of the rotary shaft is larger than a distance from the center of gravity of the balance member to the axial center of the rotary shaft, the controller being configured to control the weight inspection device and the rotary shaft of the movable member such that a timing at which the weighing object is weighed by the weighing instrument and a timing at which the rotary shaft is driven by the drive part at least partially overlap.

2. The inspection system according to claim 1, wherein the rotary shaft extends in a direction perpendicular to a conveying surface of the sorting conveyor; and
   the arm member and the balance member rotate along a plane parallel to the conveying surface of the sorting conveyor.

3. The inspection system according to claim 1, wherein the rotary shaft extends in a direction perpendicular to a conveying surface of the weighing conveyor; and
   the balance member intersects a plane through which a center of gravity of the arm member passes when the rotary shaft is rotatably driven by the drive part.

4. The inspection system according to claim 3, wherein the center of gravity of the balance member is disposed in the plane through which the center of gravity of the arm member passes when the rotary shaft is rotatably driven by the drive part.

5. The inspection system according to claim 1, wherein the balance member is provided in order to suppress vibration of the arm member in the direction perpendicular to the conveying surface of the weighing conveyor.

6. The inspection system according to claim 1, where in the moment of inertia of the arm member and the balance member about the rotary shaft is larger than the moment of inertia of only the arm member about the rotary shaft.

7. The inspection system according to claim 1, wherein a product of the weight of the balance member and the distance from the center of gravity of the balance member to an axial center of the rotary shaft is set so as to approach a product of the weight of the arm member and the distance from the center of gravity of the arm member to the axial center of the rotary shaft.

8. The inspection system according to claim 1, wherein the weight of the balance member is equal to or greater than 30% of the total of the weight of the balance member and the weight of the arm member.

9. The inspection system according to claim 8, wherein the weight of the balance member is equal to or greater than 50% of the total of the weight of the balance member and the weight of the arm member.

10. The inspection system according to claim 1, wherein the common frame also supports the sorting conveyor.

* * * * *